United States Patent
Duntoor et al.

(10) Patent No.: US 7,397,397 B1
(45) Date of Patent: Jul. 8, 2008

(54) METHOD AND SYSTEM FOR BREAKING REPETITIVE PATTERNS TO REDUCE TRANSMISSION ERRORS

(75) Inventors: Manjunath Duntoor, Santa Clara, CA (US); Srirajkumar Sundararaman, San Jose, CA (US); Anand Sridharan, Santa Clara, CA (US); Benjamin Chen, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 265 days.

(21) Appl. No.: 11/282,443

(22) Filed: Nov. 17, 2005

(51) Int. Cl.
 *H03M 7/00* (2006.01)
(52) U.S. Cl. .......................... 341/59; 341/58
(58) Field of Classification Search ............ 341/58, 341/89, 50, 59, 65, 67
 See application file for complete search history.

(56) References Cited

U.S. PATENT DOCUMENTS

| | | | |
|---|---|---|---|
| 5,638,411 A | 6/1997 | Oikawa | |
| 6,456,208 B1 * | 9/2002 | Nazari et al. | 341/59 |
| 6,504,493 B1 * | 1/2003 | Burd | 341/50 |
| 7,057,536 B2 * | 6/2006 | Lee et al. | 341/59 |
| 7,071,851 B1 * | 7/2006 | Blaum et al. | 341/59 |
| 7,102,546 B2 * | 9/2006 | Ma et al. | 341/59 |
| 7,138,931 B2 * | 11/2006 | Ito et al. | 341/59 |
| 7,242,325 B2 * | 7/2007 | Read | 341/58 |

* cited by examiner

*Primary Examiner*—Peguy JeanPierre
(74) *Attorney, Agent, or Firm*—Trellis Intellectual Property Law Group, PC

(57) ABSTRACT

A method and a system for communicating data in a communication channel are provided. The method includes the identification of a sequence of bits recurring in the data, and generating a locking pattern. The locking pattern includes locking symbols and a random bit pattern. The method also includes sending the locking pattern within the data. The locking pattern is received by a receiver and is used to lock the receiver and ignore the recurring bit sequence.

16 Claims, 7 Drawing Sheets

METHOD AND SYSTEM FOR BREAKING REPETITIVE PATTERNS TO REDUCE TRANSMISSION ERRORS

BACKGROUND OF THE INVENTION

1. Field of Invention

Embodiments of the invention relate in general to a data transfer protocol. More specifically, the embodiments of the invention relate to methods and systems of communicating data in a communication channel.

2. Description of the Background Art

High-speed serial link interfaces such as Serializer/Deserializer (SERDES) transmit data at rates of 6.25 gigabits per second (Gbps) for applications requiring very high rates of data transfer. The transfer of data is in the form of bit packets. However, the signal integrity over these high-speed communication links is affected by challenges such as signal attenuation from backplane materials, added noise due to crosstalk, multiple reflections, and Inter Symbol Interferences. High-speed serial interfaces such as SERDES use Decision Feedback Equalizer (DFE) at the receiver end, to maintain signal integrity and equalization over a communication channel. DFE circuits also reduce bit error rates.

However, certain recurring patterns result in the DFE losing equalization of signals, thereby increasing the bit error rate. The bit error rate quantifies the number of errors in bit transmission over a period of time. Recurring patterns may be a long sequence of 0's or 1's an idle pattern, or intra-packet null patterns. According to a conventional technique, this problem is overcome by 'bit-stuffing'. In this technique, the transmitter inserts a bit of the opposite polarity to the polarity of the recurring bit. The introduction of a bit of the opposite polarity breaks the continuous pattern. The receiver recognizes the bit pattern and removes the bit of the opposite polarity, knowing that it is not a part of the real data.

However, bit stuffing may not be very effective for multibit repetitive patterns in DFE. This poses challenges to signal integrity. Moreover, multi-bit repetitive patterns result in the loss of DFE equalization and the increase of bit error rate.

DETAILED DESCRIPTION OF EMBODIMENTS OF THE INVENTION

The various embodiments of the invention provide a method and a system for communicating data in a communication channel. The data can be sent in the form of packets. The data packets can be communicated over a data-link layer by using a communication protocol. According to the protocol, data is encoded on a serial stream of bits that is transmitted. A locking pattern is also generated in case the serial stream transmits a recurring sequence of bits. The locking pattern includes a special bit pattern that comprises locking symbols and a random bit pattern. A receiver, receiving the serial stream, can be locked on receiving the locking pattern. Locking the receiver avoids the recurring sequence of bits. The random bit pattern can be used for DFE equalization.

Figure 1:
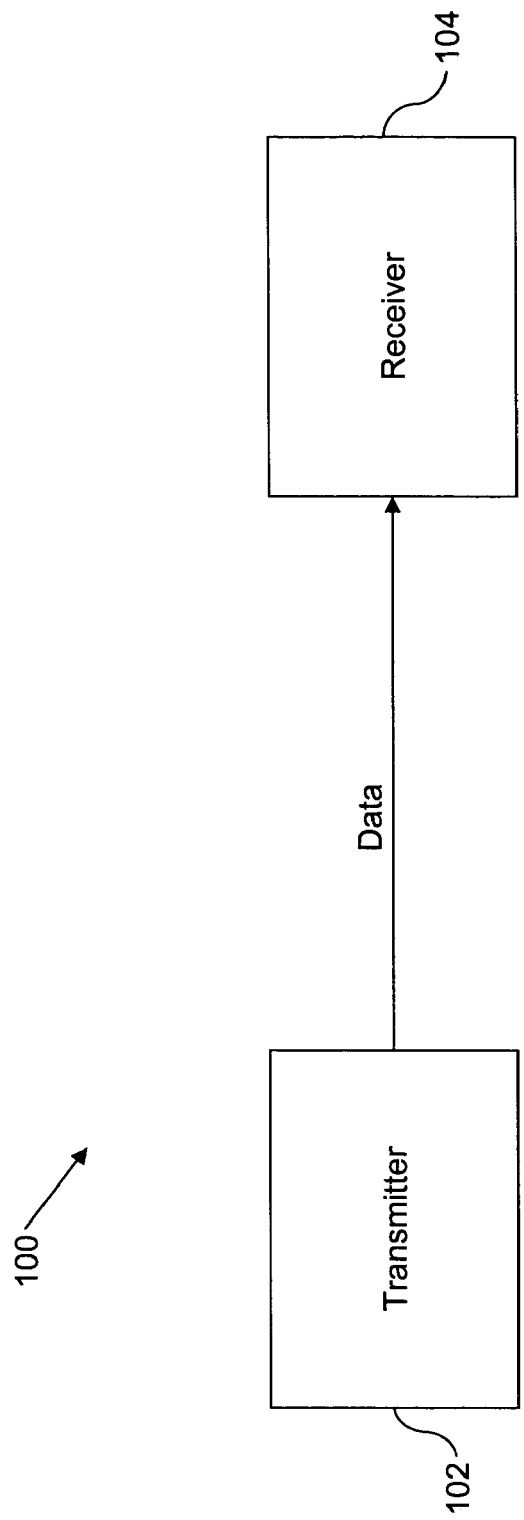
FIG. 1 illustrates an environment where an embodiment of the invention can be practiced.

FIG. 1 illustrates an environment where an embodiment of the invention can be practiced. Environment 100 includes a transmitter 102 and a receiver 104. Transmitter 102 can be an electronic device that transmits information over a communicating medium to receiver 104. The information can be transmitted via a physical medium such as a wire or an optical fiber. The information can also be transmitted as electromagnetic wave signals, such as microwave, infrared and radio signals, or by using any other form of wireless communication. Receiver 104 can be an electronic device that receives information sent by transmitter 102. Transmitter 102 can transmit data packets on channels referred to as a data bus, which is generally a group of parallel wires connecting different parts of a system. The group of parallel wires carries actual data in the form of different logic signals.

The data packets can be referred to as frames, blocks, cells or segments. Each data packet is in the form of a plurality of characters. According to various embodiments of the invention, a data packet can contain various sequences of bits. The plurality of characters in the data packets can be encoded by using one of the various character-encoding schemes that are available. Examples of character-encoding schemes that can be used in accordance with various embodiments of the invention include ASCII, Unicode, and the 8B10B-encoding scheme. According to one embodiment of the invention, the 8B10B-encoding scheme is used for encoding. 8B10B is a line code that maps 8-bit symbols to 10-bit symbols to achieve DC balance and bounded disparity. The 8 bits of data are transmitted as a 10-bit entity known as a character. The lower 5 bits of data are encoded into a 6-bit group, and the top 3 bits are encoded into a 4-bit group. These code groups are chained together to form the 10-bit character that is transmitted on the data bus.

Transmitter 102 and receiver 104 communicate according to a protocol, which defines the connection, communication, and transfer of the sequence of bits between two-data processing units. The protocol can be implemented by hardware, software, or a combination of both. Examples of protocols include a Synchronous Optical Network (SONET) and the Ethernet. In accordance with an exemplary embodiment of the invention, transmitter 102 transmits data packets to receiver 104, using the communication protocol, over the 6.25 Gbps Serializer/Deserializer (SERDES) across the back plane in the serial link. SERDES is an Integrated Circuit (IC) transceiver that converts parallel data to serial data, and vice-versa. The transmitter in SERDES is a parallel-to-serial converter, and the receiver is a serial-to-parallel converter. The SERDES link facilitates the communication of parallel data between two points over serial streams. According to various embodiments of the invention, a Media Access Control (MAC) layer over SERDES is concerned with sharing the physical connection to the network among several data-processing units.

Figure 2:
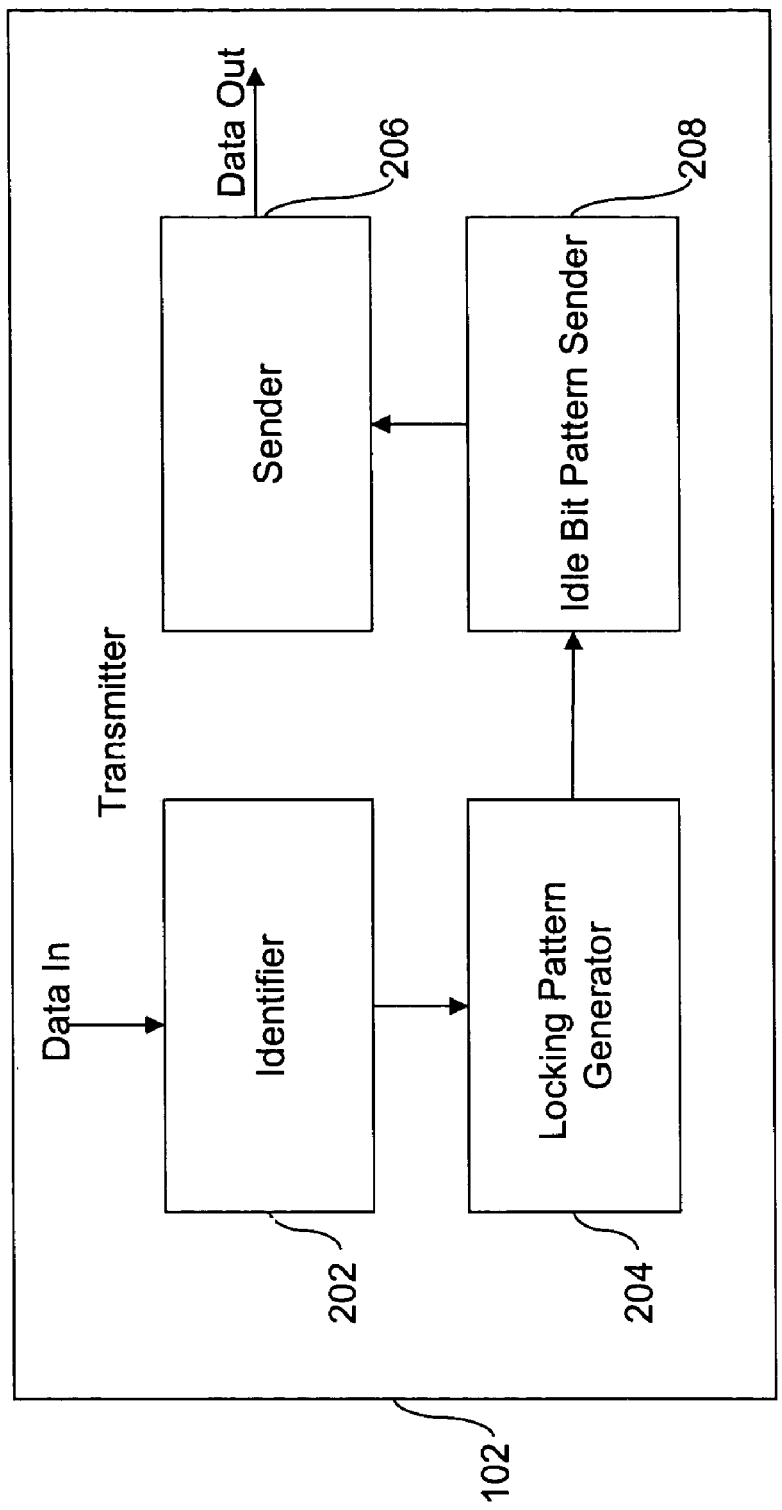
FIG. 2 illustrates a system for transmission of data, in accordance with an exemplary embodiment of the present invention.

FIG. 2 illustrates a system for transmission of data, in accordance with an exemplary embodiment of the present invention. Transmitter 102 includes an identifier 202, a locking pattern generator 204, a sender 206, and an idle bit pattern sender 208. According to various embodiments of the invention, identifier 202 identifies a recurring sequence of bits in the transmitted data. The recurring sequence of bits may be long sequences of 0's and 1's, an idle bit pattern, or an intra-packet null pattern. The idle bit pattern is transmitted by high-speed transceivers as a placeholder or for link maintenance. The idle bit pattern is sent when there is no specific data to be sent across the channel, and at the same time the link is to be maintained. The specific sequence of an idle bit pattern can be determined by the communication protocol and can be a control character such as K28.5, according to the various embodiments of the invention. K28.5 is a special 10-bit character in the 8b10b encoding. K28.5 can be used for marking the beginning or end of a frame. It is inserted for hardware synchronization. Similarly, if transmitter 102 does not have any bytes to send in the middle of a data packet, it can send one or more lines of intra packet gap bit patterns. The intra packet gap bit patterns can also be called stuff lines. According to various embodiments of the invention, a stuff line can be transmitted when receiver 104 requests transmitter 102 to stop sending data in the middle of the transmission of a data packet.

Locking pattern generator 204 generates a locking pattern to break the recurring sequence of bits in the data. The locking pattern includes one or more lines of locking symbols and one or more lines of a random bit pattern. The locking symbols initialize the locking pattern and indicate the presence of a recurring sequence of bits in the serial stream of the data to receiver 104. On receiving the locking symbols, receiver 104 can lock itself and ignore the recurring sequence of bits. According to an embodiment of the invention, a random bit pattern follows the locking symbols in the locking pattern. The random bits comprise pseudo-random bits, which can be generated by using a mathematical formula or software program. A seed bit is used as the first bit to generate subsequent random bits. If the pseudo-random bit generation function is designed suitably, the sequence of bits will appear to be statistically random.

The locking pattern generator 204 generates the locking pattern, which is inserted in the data packet, in order to break the recurring sequence of bits. Generator 204 then sends the locking pattern to the idle bit pattern sender 208. Sender 208 sends the idle bit pattern (including the locking pattern in the bit stream) to sender 206 to maintain the link in the communication channel. Sender 206 sends out the bit stream, which includes the data packet, the idle bit pattern and the locking pattern.

An exemplary pattern across the interface between transmitter 102 and receiver 106 that has a locking pattern according to one of the embodiments of the invention, can look like the following pattern:

| Lock | Lock | Lock | Lock |
| Rand | Rand | Rand | Rand | where 'Lock' is a locking symbol and 'Rand' is a random bit pattern.

Figure 3:
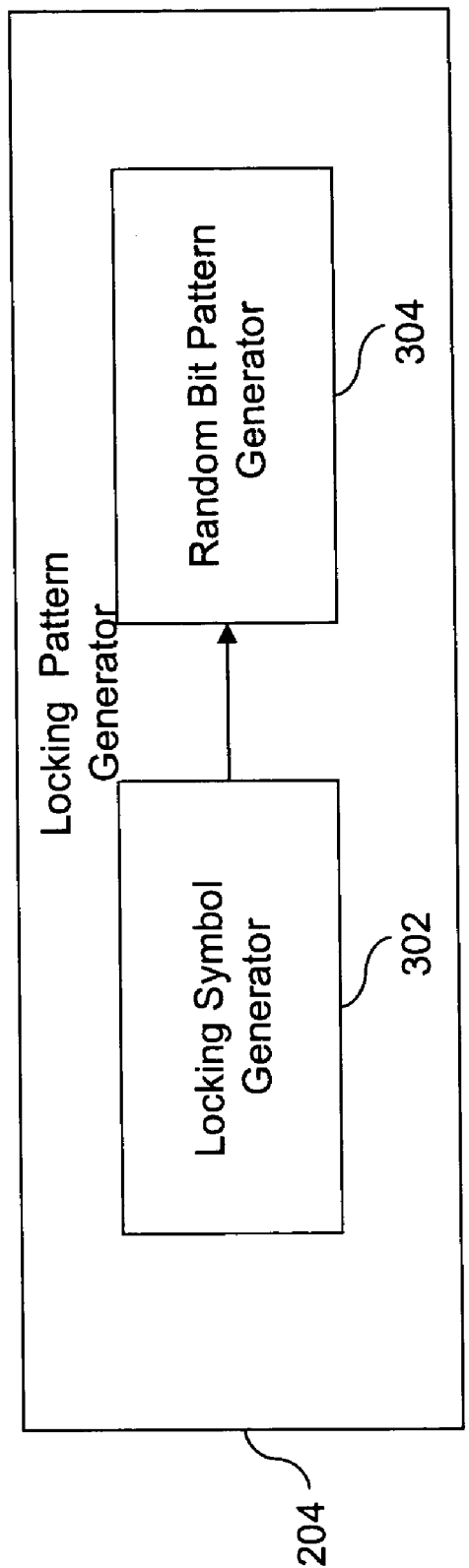
FIG. 3 illustrates a locking pattern generator, in accordance with an exemplary embodiment of the present invention.

FIG. 3 illustrates a locking pattern generator, in accordance with an exemplary embodiment of the present invention. In an embodiment, locking pattern generator 204 includes a locking symbol generator 302 and a random bit pattern generator 304. Locking symbol generator 302 generates the locking symbols. The locking symbols initialize the locking pattern and cause receiver 104 to be locked. On receiving the locking symbols, receiver 104 ignores the recurring sequence of bits. Random bit pattern generator 304 generates the random bit pattern. The random bits are pseudo random bits. The number of bits in the pseudo random bit pattern may differ, and can be set according to the requirement. A pseudo random bit generator generates pseudo random bits. According to various embodiments of the invention, the pseudo random bit generator may be an 8-bit pseudo random generator, a 32-bit pseudo random generator, or a 48-bit pseudo random generator. According to an embodiment of the invention, a PRBS7 generator generates the pseudo random bits. The pseudo random generator uses a pseudo random algorithm, which can be based on a linear feedback shift register.

Figure 4:
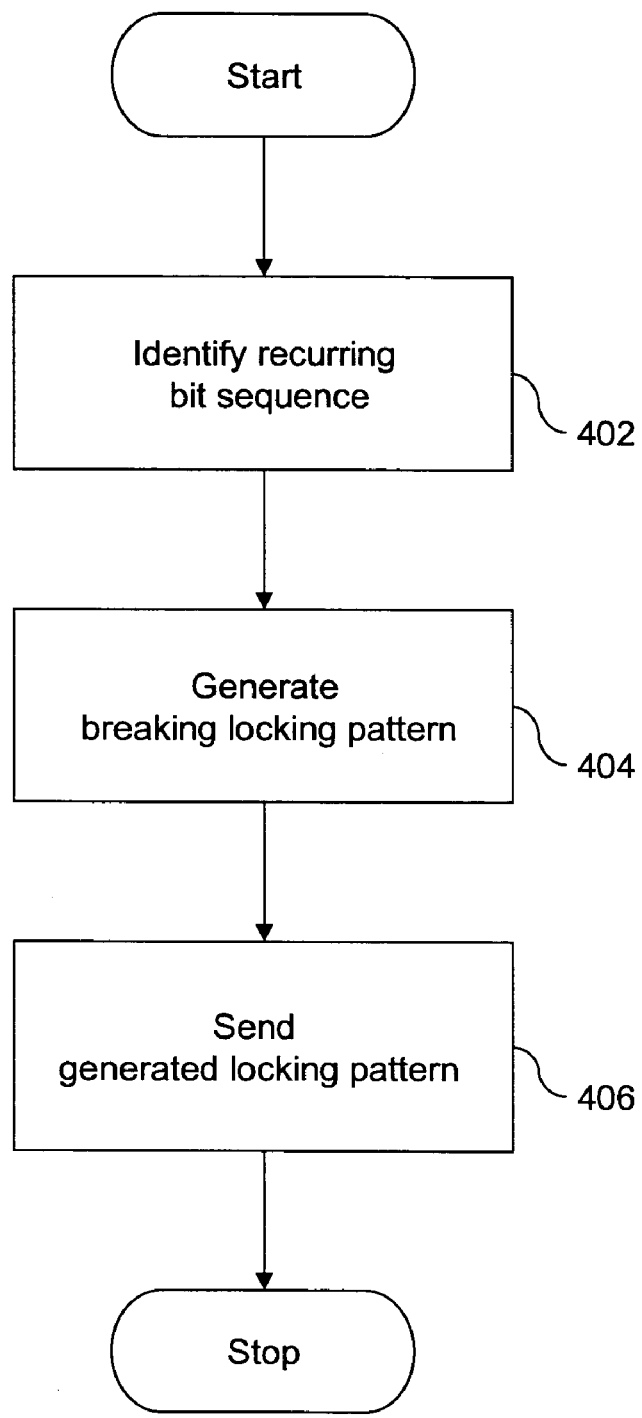
FIG. 4 illustrates a flowchart for a method of transmitting data in a communication channel, in accordance with an exemplary embodiment of the present invention.

FIG. 4 illustrates a flowchart of a method for transmitting data in a communication channel. At step 402, identifier 202 identifies a recurring sequence of bits. At step 404, locking pattern generator 204 generates a locking pattern. At step 406, sender 206 sends the generated locking pattern within the data. The locking pattern includes locking symbols and random bit patterns. According to various embodiments of the invention, the locking symbols cause receiver 104 to lock itself and ignore the subsequent recurring sequence of bits. The random bit pattern enables DFE adaptation, and results in equalization of the signals. Decision Feedback Equalizer (DFE) is present at receiver 104 for equalization of the signals.

Figure 5:
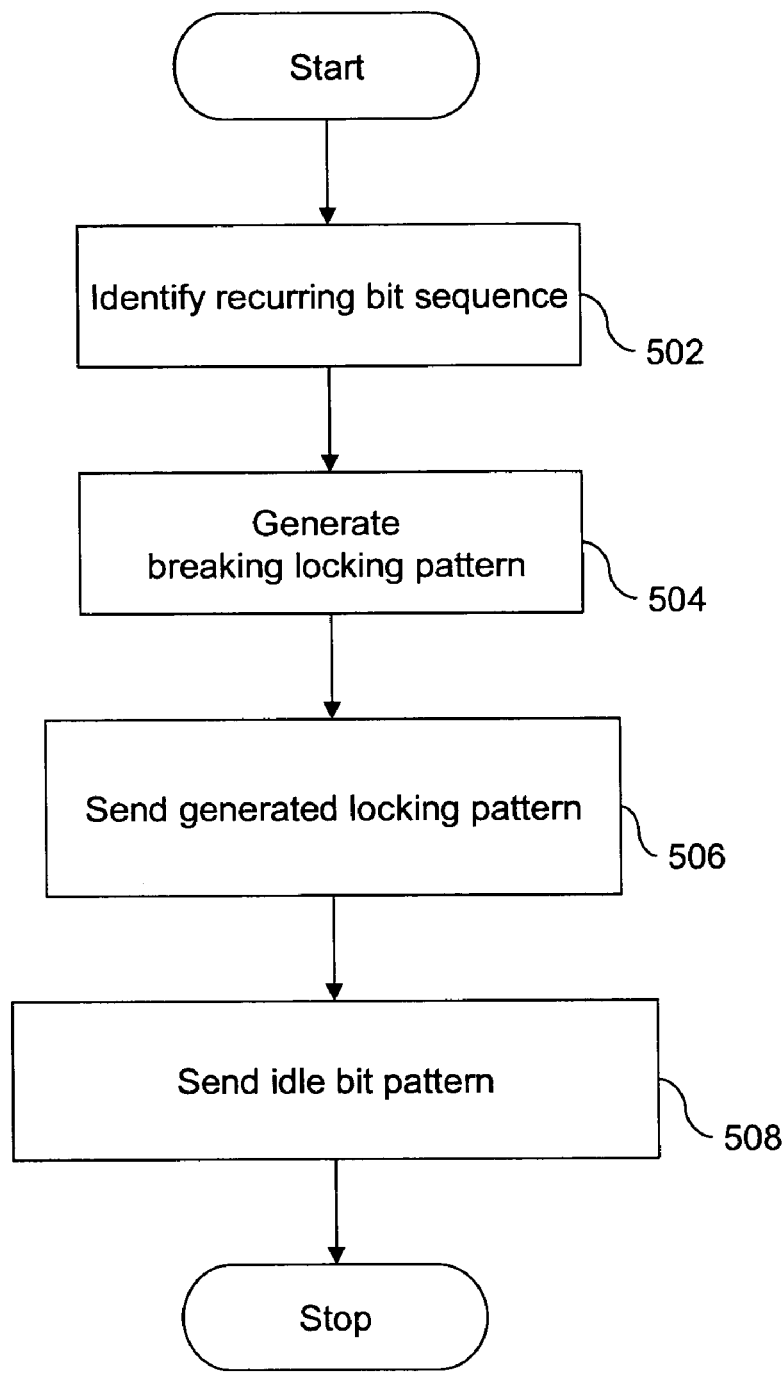
FIG. 5 illustrates a flowchart for a method of transmitting data in a communication channel, in accordance with another exemplary embodiment of the invention.

FIG. 5 illustrates a flowchart of a method for transmitting data in a communication channel, in accordance with another exemplary embodiment of the invention. At step 502, identifier 202 identifies a recurring sequence of bits. At step 504, locking pattern generator 204 generates a locking pattern. The locking pattern comprises locking symbols for locking receiver 104, followed by a random bit pattern that enables DFE to maintain equalization. At step 506, the generated locking pattern is sent within the data. The random bit pattern follows the locking symbols in the data. At step 508, one or more lines of the idle bit pattern are sent after the locking pattern in the data, to maintain a link in the communication channel.

Figure 6:
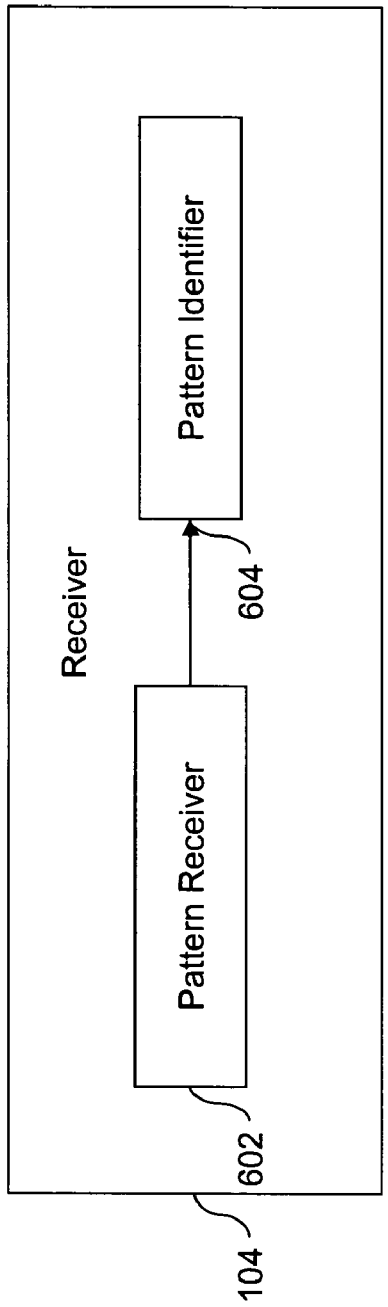
FIG. 6 illustrates a system for receiving data, in accordance with an exemplary embodiment of the present invention.

FIG. 6 illustrates a system for receiving data, in accordance with an exemplary embodiment of the present invention. In an embodiment, receiver 104 includes a pattern receiver 602 and a pattern identifier 604. Pattern receiver 602 receives the bit sequence transmitted by transmitter 102. Pattern identifier 604 can identify the presence of a locking pattern in the received bit sequence. The locking pattern can be identified on the basis of locking symbols and random bit patterns. Once these patterns are identified, receiver 104 is locked. Thereafter, receiver 104 can ignore the random bit pattern. The identified random bit pattern enables DFE adaptation in the receiver.

Figure 7:
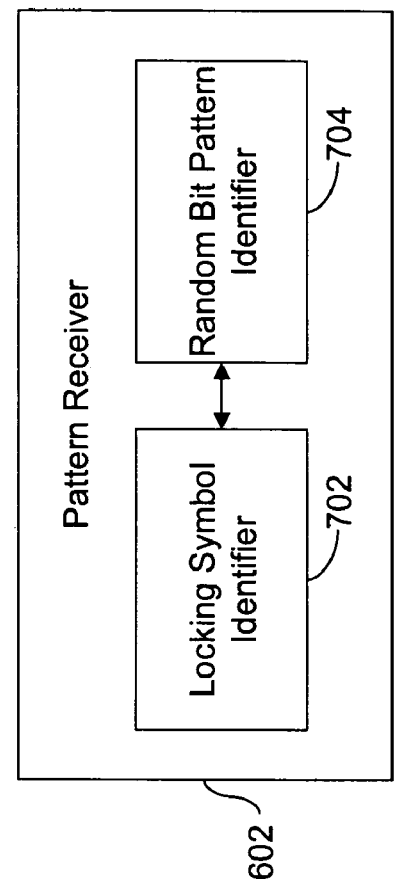
FIG. 7 illustrates a pattern identifier, in accordance with an exemplary embodiment of the present invention.

FIG. 7 illustrates a pattern identifier, in accordance with an exemplary embodiment of the present invention. Pattern identifier 604 includes a locking symbol identifier 702 and a random bit pattern identifier 704. Locking symbol identifier 702 identifies the locking symbols in the locking pattern. The locking symbols include special locking bits, which indicate the presence of a recurring bit sequence to receiver 104. Random bit pattern identifier 704 identifies the random bit pattern, which follows the locking symbols. The random bit pattern enables DFE to maintain equalization.

Figure 8:
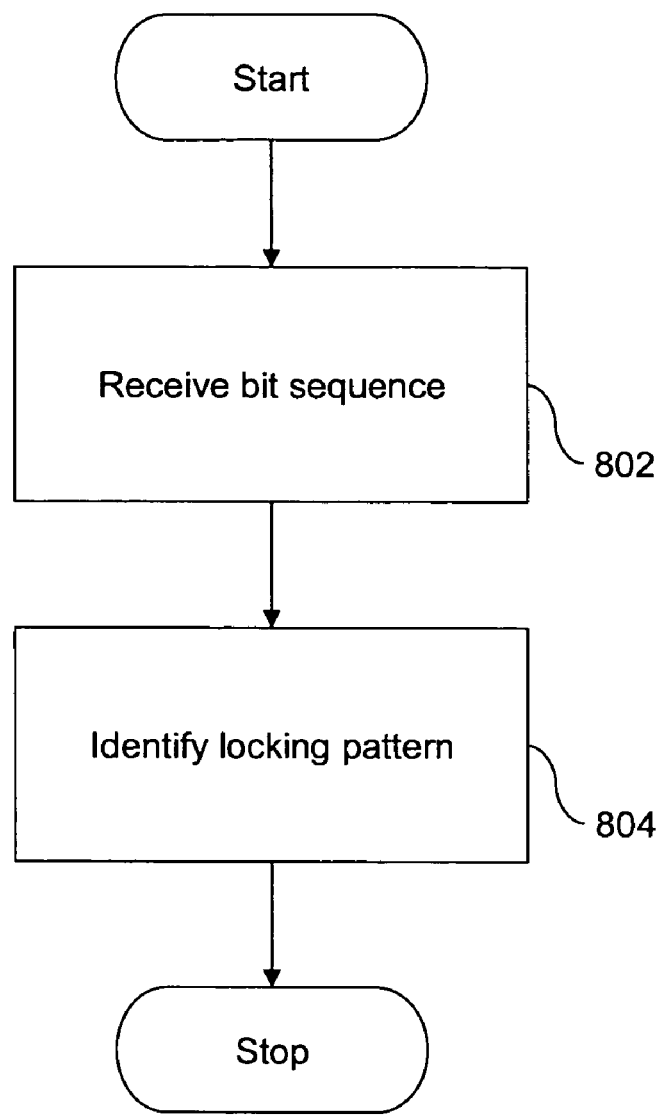
FIG. 8 illustrates a flowchart for a method of receiving data in a communication channel, in accordance with an exemplary embodiment of the present invention.

FIG. 8 illustrates a flowchart of a method for receiving data in a communication channel, in accordance with an exemplary embodiment of the present invention. At step 802, pattern receiver 602 receives a bit sequence. At step 804, pattern identifier 604 identifies the locking pattern in the received bit sequence. Thereafter, receiver 104 locks itself and ignores the recurring sequence of bits.

Various embodiments of the invention provide a method and a system for breaking any recurring sequence of bits in the data to be communicated over a communication channel. A locking pattern is generated and inserted in the data to break the recurring sequence of bits. The locking pattern includes locking symbols and random bit patterns. A receiver locks itself and ignores the subsequent recurring sequence of bits, on receiving the locking symbols. The locking pattern enables receiver 104 to ignore the following random bit pattern. The random bit pattern enables DFE to maintain equalization. Signal integrity is also maintained as a result of DFE equalization. Therefore, errors in data communication are significantly reduced.

Although the invention has been discussed with respect to specific embodiments thereof, these embodiments are merely illustrative, and not restrictive, of the invention. For example, a 'data transfer protocol for 6.25 Gbps serializer/Deserializer (SERDES)' can include any type of analysis, manual or automatic, to anticipate the needs of communicating data.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method of communicating data in a communication channel, the method comprising:
    identifying a sequence of bits, the sequence recurring in the data;
    generating a locking pattern, the locking pattern comprising at least one of one or more lines of locking symbols and one or more lines of random bit pattern; and
    sending the generated locking pattern in the data, the generated locking pattern breaking the recurring sequence of bits.

2. The method of claim 1, wherein the data communication takes place through a MAC layer.

3. The method of claim 1, wherein the one or more lines of random bit pattern comprises one or more lines of 32-bit pseudo random bit pattern.

4. The method of claim 1 further comprises sending one or more lines of idle bit pattern after the generated locking pattern, the idle bit pattern maintaining the communication channel.

5. The method of claim 1, wherein the sending the locking pattern further comprises encoding the locking pattern.

6. The method of claim 5, wherein the encoding is performed using an 8b10b encoding.

7. A method of communicating data in a communication channel, the method comprising:
    identifying a sequence of bits, the sequence recurring in the data;
    generating a locking pattern, the locking pattern comprising at least one of one or more lines of locking symbols and one or more lines of random bit pattern;
    sending the generated locking pattern in the data, the generated locking pattern breaking the recurring sequence of bits; and
    sending one or more lines of idle bit pattern, the idle bit pattern maintaining the communication channel.

8. A method of receiving data in a communication channel, the method comprising:
    receiving a bit sequence;
    identifying a locking pattern in the received bit sequence, the locking pattern comprising a special bit pattern;
    identifying one or more lines of locking symbols; and
    identifying one or more lines of random bit pattern for DFE equalization.

9. An apparatus for communicating data over a communication channel, the apparatus comprising:
    an identifier for identifying a sequence of bits, the sequence recurring in the data;
    a locking pattern generator for generating a locking pattern, the locking pattern generator comprising
        a locking symbol generator for generating one or more lines of locking symbols; and
        a random bit pattern generator for generating one or more lines of random bit pattern;
    a sender for sending the generated locking pattern in the data, the generated locking pattern breaking the recurring sequence of bits; and
    an idle bit pattern sender for sending one or more lines of idle bit pattern, the idle bit pattern maintaining the communication channel.

10. The apparatus of claim 9, wherein the random bit generator comprises a pseudo random bit generator.

11. The apparatus of claim 10, wherein the pseudo random bit generator comprises a PRBS7 pseudo random generator.

12. An apparatus for receiving data in a communication channel, the apparatus comprising:
    a pattern receiver for receiving a bit sequence;
    a pattern identifier for identifying a locking pattern in the received bit sequence, the locking pattern comprises a special bit pattern;
    a locking symbols identifier for identifying one or more lines of locking symbols; and
    a random bit pattern identifier for identifying one or more lines of random bit pattern, the random bit pattern being identified for DFE equalization.

13. A system for communicating data over a communication channel, the system comprising:
    means for identifying a sequence of bits, the sequence recurring in the data;
    means for generating a locking pattern, the locking pattern comprising at least one of one or more lines of locking symbols and one or more lines of random bit patter;
    means for sending the generated locking pattern in the data, the generated locking pattern breaking the recurring sequence of bits; and
    means for sending one or more lines of idle bit pattern, the idle bit pattern maintaining the communication channel.

14. A system for receiving data over a communication channel, the system comprising:
    means for receiving a bit sequence; and
    means for identifying a locking pattern in the received bit sequence, the locking pattern comprises a special bit pattern
    means for identifying one or more lines of locking symbols; and
    means for identifying one or more lines of random bit pattern for DFE equalization.

15. A machine-readable medium including instructions executable by a processor comprising:
    one or more instructions for identifying a sequence of bits, the sequence recurring in data;
    one or more instructions for generating a locking pattern, the locking pattern comprising at least one of one or more lines of locking symbols and one or more lines of random bit pattern;
    one or more instructions for sending the generated locking pattern in the data, the generated locking pattern breaking the recurring sequence of bits; and
    one or more instructions for sending one or more lines of idle bit pattern, the idle bit pattern maintaining the communication channel.

16. An apparatus for communicating data over a communication channel, the apparatus comprising:
    a processor for executing instructions; and
    a machine-readable medium including instructions executable by the processor comprising:
        one or more instructions for identifying a sequence of bits, the sequence recurring in the data;
        one or more instructions for generating a locking pattern, the locking pattern comprising at least one of one or more lines of locking symbols and one or more lines of random bit pattern;
        one or more instructions for sending the generated locking pattern in the data, the generated locking pattern breaking the recurring sequence of bits; and
        one or more instructions for sending one or more lines of idle bit pattern, the idle bit pattern maintaining the communication channel.

* * * * *